UNITED STATES PATENT OFFICE.

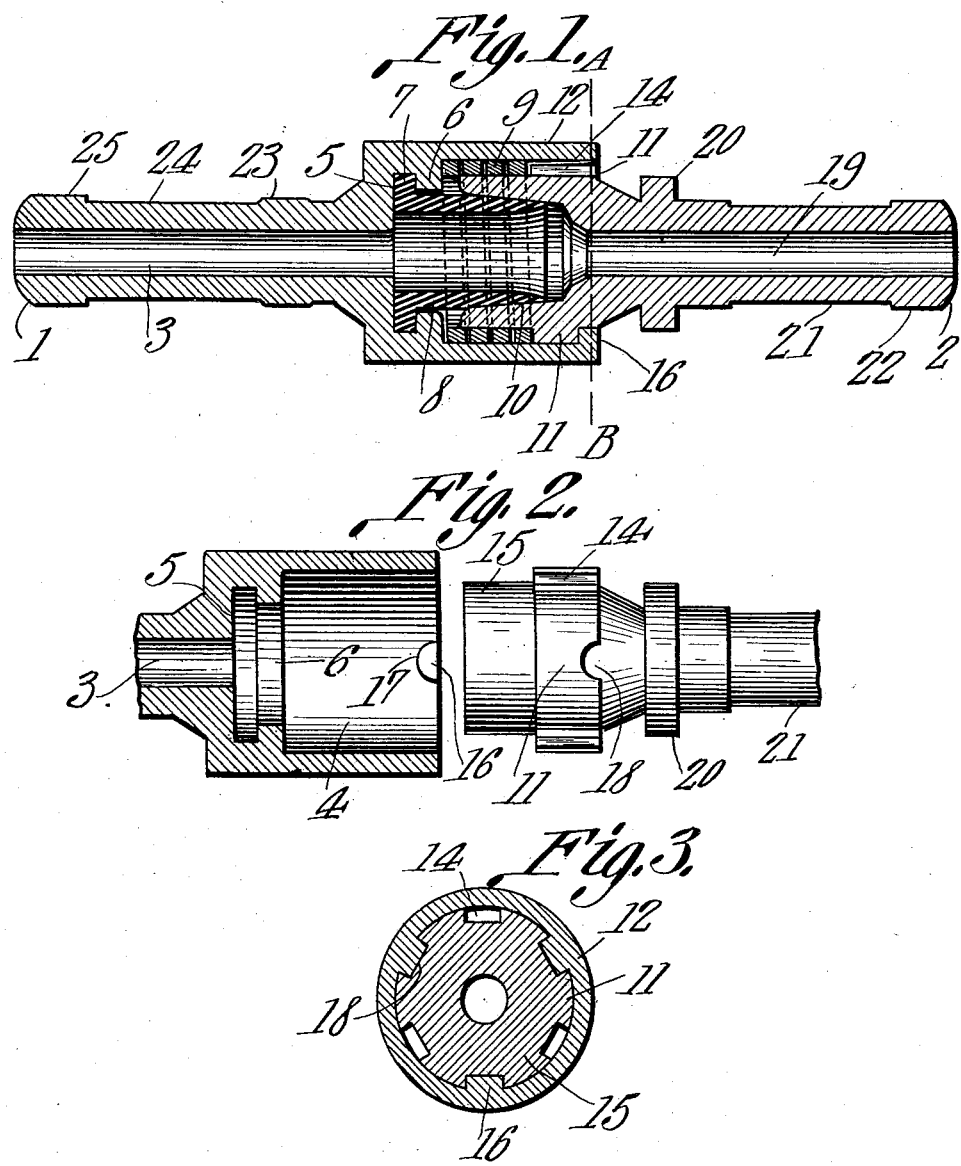

WILLIAM H. SHEPHEARD, OF PORTSMOUTH, VIRGINIA.

HOSE-COUPLING.

967,679.  Specification of Letters Patent.  Patented Aug. 16, 1910.

Application filed June 14, 1910. Serial No. 566,806.

*To all whom it may concern:*

Be it known that I, WILLIAM H. SHEP-HEARD, a citizen of the United States, residing at Portsmouth, in the county of Norfolk and State of Virginia, have invented a new and useful Hose-Coupling, of which the following is a specification.

It is the object of this invention to provide a hose coupling, the component elements of which may readily be assembled and disconnected.

Another object of the invention is to provide a hose coupling which will unite the ends of a hose against leakage.

Another object of the invention is to provide novel means for retaining the constituent elements of the coupling together.

The drawings show typical embodiments merely, and it is to be understood that changes, properly falling within the scope of what is claimed, may be made without departing from the spirit of the invention.

In the drawings,—Figure 1 shows the invention in longitudinal section; Fig. 2 is a sectional elevation, showing the two constituent elements of the coupling separated; parts being broken away; Fig. 3 is a transverse section upon the line A—B of Fig. 1.

The invention includes a tubular socket 1, and a tubular head 2 which is adapted to be inserted within the socket 1, the diameter of the head 2 at one end being enlarged, as denoted by the numeral 15, and the socket 1 being enlarged as denoted by the numeral 12.

The bore 3 of the socket 1 is enlarged as denoted by the numeral 4, to define, within the socket 1, a shoulder 5. Located within the enlarged portion of the bore of the socket 1, and projecting inwardly into the socket, is an annular rib 6, preferably fashioned integrally with the socket.

The invention further includes a resilient thimble, preferably fashioned from rubber. This thimble includes a flange 7, adapted to fit between the shoulder 5 and the rib 6; the tubular body portion 8 of the thimble being formed integrally with the flange 7.

The tubular body 8 of the thimble projects into the enlarged portion 4 of the bore of the socket. This body of the thimble is surrounded by a helical compression spring 9, which at one end rests against the rib 6. The inner face of the bore of the enlarged portion 15 of the head 2 is tapered or inclined, as denoted by the numeral 11, the outer face of the body 8 of the thimble being correspondingly inclined, so that when the portion 15 of the head is thrust within the portion 12 of the socket, the free end of the body 8 of the thimble will be closely engaged within the bore of the portion 15, and compressed transversely therein, thus securing a water tight joint.

The portion 15 of the head 2 is provided with an annular outstanding shoulder 11. In this shoulder 11 there are longitudinally extended channels 14, these channels being adapted to receive lugs 16, projecting toward the axis of the socket 1, and formed integrally with the portion 12 thereof, adjacent the end of said portion. The inner end faces of the lugs 16 are rounded, as denoted by the numeral 17, there being notches 18 located in the outer end faces of the shoulder 11, in which notches, the lugs are adapted to fit; it being noted that the notches 18 are rounded, so as to receive the lugs 17.

The bore 19 of the head 2 is of course enlarged, so as to engage the thimble. There is an outstanding annular flange 20 upon the head 2, against which flange the end of the hose is adapted to abut. The head 2 is grooved, about its periphery, as shown at 21, to define, at the end of the head 2, an enlargement 22. The hose may be contracted, by any suitable clamping means, to fit within the grooved portion 21 of the head 2.

The socket 1 is provided with an annular shoulder 23, with a groove 24, and with a terminal enlargement 25, the last named elements coöperating in the well known manner, with a clamp or other securing device, to maintain the hose in place upon the part 1.

In practical operation, the enlarged portion 15 of the head 2 is thrust within the enlarged portion 12 of the socket 1, the tapered body 8 of the thimble entering the tapered portion 10 of the bore 19 of the head 2. As the part 2 is thrust home, the body 8 of the resilient thimble will be compressed transversely, and wedged in the mouth of the head 2, thus securing a water tight joint. During the operation above described, the lugs 16 should be alined with the channels 14. The lugs 16 will traverse the channels from end to end, as the head 2 is thrust home. The inner end face of the shoulder 11 will bear against the compression spring 9, and force the same together. When the head 2 is rotated within the socket 1, the lugs 16 will move out of alinement with the channels 14, and enter the notches 18. The coöperation between the lugs 16 and the notches 18 will be maintained by the action of the compression spring 9.

By reason of the fact that the inner end faces of the lugs 8 are rounded, as shown at 17, and by reason of the fact that the notches 18 correspond in their contour to the faces 17 of the lugs, the lugs may be made to enter notches without difficulty, and without taking the precaution of alining the lugs exactly with the notches. Moreover, when the socket 1 and the head 2 are to be separated, a rotation of either one of these members, will cause the rounded end faces 17 of the lugs 16 to ride over the curved faces of the notches 18, the lugs 16 thus exerting a cam action, the rotation of the head 2 or of the socket 1 thus serving to compress the spring 9, without requiring a noticeable thrust in the axis of the device.

Having thus described the invention, what is claimed is:—

1. In a device of the class described, a socket having lugs at one end projecting toward the axis of the socket; a head adapted to be inserted into the socket and provided with a shoulder having channels through which the lugs may freely slide; the outer face of the shoulder having notches located between the channels and adapted to receive the lugs, the inner end faces of the lugs and the corresponding walls of the notches being rounded to facilitate the seating and unseating of the lugs upon relative rotatory movement between the socket and the head; a tubular thimble located within the socket and adapted to fit within the end of the head and to be compressed transversely thereby; and a helical compression spring located within the socket and engageable by the shoulder of the head, the spring constituting a guide to engage the outer face of the head to direct the head about the thimble.

2. In a device of the class described, a socket having its bore enlarged to form a shoulder, the socket being provided with an internal rib; a resilient thimble mounted in the enlarged portion of the bore of the socket and consisting of an outstanding flange adapted to register between the shoulder and the rib, and a tubular body integral with the rib and tapered upon its exterior toward its free end; a compression spring resting upon the rib; and a tubular head adapted to be inserted in the socket and having its bore tapered to receive and to compress the tapered body of the thimble; there being an outstanding shoulder upon the head adapted to compress the spring; the socket having inwardly projecting lugs and the shoulder of the head being provided with channels through which the lugs may freely slide, there being notches in the outer edge of the shoulder of the head, in which notches the lugs are adapted to fit, when the socket and the head are rotated with respect to each other, the compression spring constituting a means for retaining the lugs in the notches.

In testimony that I claim the foregoing as my own, I have hereto affixed my signature in the presence of two witnesses.

WILLIAM H. SHEPHEARD.

Witnesses:
B. T. LASSITERS,
J. S. CRAWFORD.